United States Patent [19]

Kimura

[11] Patent Number: 4,974,927

[45] Date of Patent: Dec. 4, 1990

[54] ORIGINAL-ILLUMINATING DEVICE FOR USE IN AN IMAGE-READING DEVICE

[75] Inventor: Kei Kimura, Kanagawa, Japan

[73] Assignee: Fuji Photo Film Co., Ltd., Kanagawa, Japan

[21] Appl. No.: 206,397

[22] Filed: Jun. 14, 1988

[30] Foreign Application Priority Data

Jun. 18, 1987 [JP] Japan .................................. 62-151762

[51] Int. Cl.⁵ ............................................... G02B 6/04
[52] U.S. Cl. ............................... 350/96.24; 350/96.18
[58] Field of Search ........................... 350/96.24–96.27, 350/96.1, 96.18

[56] References Cited

U.S. PATENT DOCUMENTS 4,409,477 10/1983 Carl ...................................... 250/227
4,730,895 3/1988 Siedband et al. ................. 350/96.24

FOREIGN PATENT DOCUMENTS 0067696 12/1982 European Pat. Off. ......... 350/96.25
52-35648 3/1977 Japan .................................. 350/96.18
60-73505 4/1985 Japan .................................. 350/96.25

Primary Examiner—William L. Sikes
Assistant Examiner—John Ngo
Attorney, Agent, or Firm—Sughrue, Mion, Zinn, Macpeak & Seas

[57] ABSTRACT

A subject or original illuminating device includes a spot-like light source for emitting illuminating light, a plurality of optical fibers having first ends bundled together near the light source and opposite ends arranged in an array along a main scanning line on a subject to be illuminated, the opposite ends in the array being spaced at intervals which are progressively smaller from a center toward opposite ends of the array, and a cylindrical lens disposed between the opposite ends of the optical fibers and the subject for converging the illuminating light from the opposite ends of the optical fibers onto the main scanning line on the subject. The optical fibers may have their opposite ends equally spaced in the array and including selected light emitting ends spaced at intervals which are progressively smaller from a center toward opposite ends of the array, and the cylindrical lens may converge the illuminating light from the selected light emitting ends of the optical fibers onto the main scanning line on the subject.

13 Claims, 5 Drawing Sheets

ORIGINAL-ILLUMINATING DEVICE FOR USE IN AN IMAGE-READING DEVICE

BACKGROUND OF THE INVENTION

The present invention relates to a subject illuminating device, and more particularly to a subject or original illuminating device including a linear array of optical fibers having respective ends for emitting illuminating light toward a subject or original, which ends are spaced progressively closer from the center toward the opposite ends of the array for shading correction of image information from the subject.

In printing and platemaking industries, image scanning recording/reproducing systems are widely used for electrically processing image information on subjects or originals to produce film plates with a view to simplifying the operation process and increasing the image quality.

Such an image scanning recording/reproducing system is basically constructed of an image reading device and an image recording device. In the image reading device, image information on a subject which is fed in an auxiliary scanning direction is scanned in a main scanning direction by a photoelectric transducer which converts the image information to an electric signal. Then, the image information which has been photoelectrically converted by the image reading device undergoes various processes such as for gradation correction, profile emphasis, and the like dependent on platemaking conditions in the image recording device. Thereafter, the image information thus processed is converted to a light signal represented by a laser beam, which is applied to an image recording medium made of a photosensitive material such as a photographic film to record the image information thereon. The image recorded on the image recording medium is then developed by an image developing device, and the developed image recording medium is used as a film plate for printing operation or the like.

The image reading device employs a charge-coupled device (hereinafter referred to as a "CCD") composed of a linear array of photoelectric transducers along a main scanning line for scanning the image information on the subject at high speed. The subject or original is illuminated along the main scanning line by illuminating light, and light reflected from the subject is focused as image information on the CCD by a focusing optical system. Then, the image information is photoelectrically converted into a desired image signal by the CCD.

The brightness of the edge of the image field represented by the light reflected from the subject or original is reduced by the cosine law and vignetting of the optical system. Since the image with such reduced brightness is focused on the CCD, the image signal is subjected to shading unless the reflected light is corrected.

Many proposals have heretofore been made for correcting the shading of images caused by a focusing optical system. According to one proposal, a light-shielding plate of a partly circular shape is disposed in the light path of illuminating light for linearly illuminating a subject or original along a main scanning line or the light path of light reflected from the subject, so as to reduce the amount of light reflected from the center of the main scanning line to a level lower than the amount of light reflected from the opposite ends of the main scanning line (see Japanese Laid-Open Patent Publications Nos. 56-62473 and 58-96453, for example). In another proposed arrangement, a slit having a width which is progressively narrower from the ends to the center thereof is disposed in front of an illuminating light source that is elongate along a main scanning line on a subject, for reducing the amount of illuminating light applied to the subject in the vicinity of the center of the main scanning line (see Japanese Laid-Open Patent Publications Nos. 56-107671, 58-146174, and 56-58364, for example).

With all of these prior art attempts, however, since the illuminating light is partly blocked or eliminated for shading correction, the efficiency of illumination of the subject or original is lowered, the image resolution by the CCD is reduced, and the device is costly to manufacture.

To solve the aforesaid problems of the conventional schemes, it has been attempted to construct an illuminating light source into a shape according to a pattern of shading of the image of a subject or original. That is, the opposite ends of the illuminating light source which is elongate along a main scanning line on a subject (original) are bent toward the center of the illuminating light source to increase the amount of light applied from the bent ends to the subject (see Japanese Laid-Open Utility Model Publication No. 60-94765). Another similar illuminating light source which is elongate along a main scanning line on a subject or original has opposite ends of double structure (see Japanese Laid-Open Utility Model Publication No. 60-109260).

These illuminating light sources are however very special in configuration, and hence cannot be mass-produced inexpensively.

Japanese Laid-Open Patent Publication No. 56-161773 discloses an illuminating light source capable of illuminating a subject or original efficiently with high illuminance. The illuminating light source comprises an array of LEDs disposed along a main scanning line on a subject and spaced at intervals which are progressively smaller from the center toward the opposite ends of the main scanning line. Inasmuch as the opposite ends of the main scanning line are illuminated with higher illuminance, any shading on the reproduced image of the subject is effectively corrected.

However, the disclosed illuminating light source has proven unsatisfactory in that the reproduced image suffers from density irregularities or variations inasmuch as the LEDs are positioned near the subject for higher illuminance on the subject and those LEDs which illuminate the central area of the main scanning line are relatively coarsely spaced.

SUMMARY OF THE INVENTION

It is a primary object of the present invention to provide a subject (original) illuminating device including a linear array of optical fibers having respective ends, which are spaced progressively closer from the center toward the opposite ends thereof, for emitting illuminating light toward a subject or original on a main scanning line thereon through a cylindrical lens, so that the subject (original) can be illuminated effectively while correcting the shading of image information carried by the subject.

Another object of the present invention is to provide a subject (original) illuminating device comprising a spot-like light source for emitting illuminating light, a plurality of optical fibers having first ends bundled together near said light source and opposite ends arranged in an array along a main scanning line on a subject (original) to be illuminated, said opposite ends in the array being spaced at intervals which are progressively smaller from a center toward opposite ends of said array, and a cylindrical lens disposed between said opposite ends of the optical fibers and said subject (original) for converging the illuminating light from said opposite ends of the optical fibers onto the main scanning line on the subject (original).

Still another object of the present invention is to provide a subject illuminating device, further comprising a cylindrical light guide disposed between said light source and said one ends of the optical fibers and having an inner reflecting wall surface.

Yet another object of the present invention is to provide a subject illuminating device, further comprising a housing which accommodates therein said opposite ends of the optical fibers.

Yet still another object of the present invention is to provide a subject illuminating device wherein said intervals are smaller in a step-like manner from the center toward the opposite ends of said array.

It is also an object of the present invention to provide a subject (original) illuminating device comprising a spot-like light source for emitting illuminating light, a plurality of optical fibers having first ends bundled together near said light source and equally spaced opposite ends arranged in an array along a main scanning line on a subject to be illuminated, said opposite ends including selected light emitting ends spaced at intervals which are progressively smaller from a center toward opposite ends of said array, and a cylindrical lens disposed between said opposite ends of the optical fibers and said subject for converging the illuminating light from said selected light emitting ends of the optical fibers onto the main scanning line on the subject.

A further object of the present invention is to provide a subject illuminating device, further comprising a cylindrical light guide disposed between said light source and said one ends of the optical fibers and having an inner reflecting wall surface.

A still further object of the present invention is to provide a subject illuminating device, further comprising a housing which accommodates therein said opposite ends of the optical fibers.

A yet further object of the present invention is to provide a subject illuminating device, wherein said equally spaced opposite ends in the array or said first ends of the optical fibers near said light source are selectively associated with light-shielding means for making the intervals of said selected light emitting ends progressively smaller from the center toward the opposite ends of said array.

A yet still further object of the present invention is to provide a subject illuminating device, wherein said light-shielding means comprises a light-shielding coating on each of selected opposite ends of said optical fibers.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
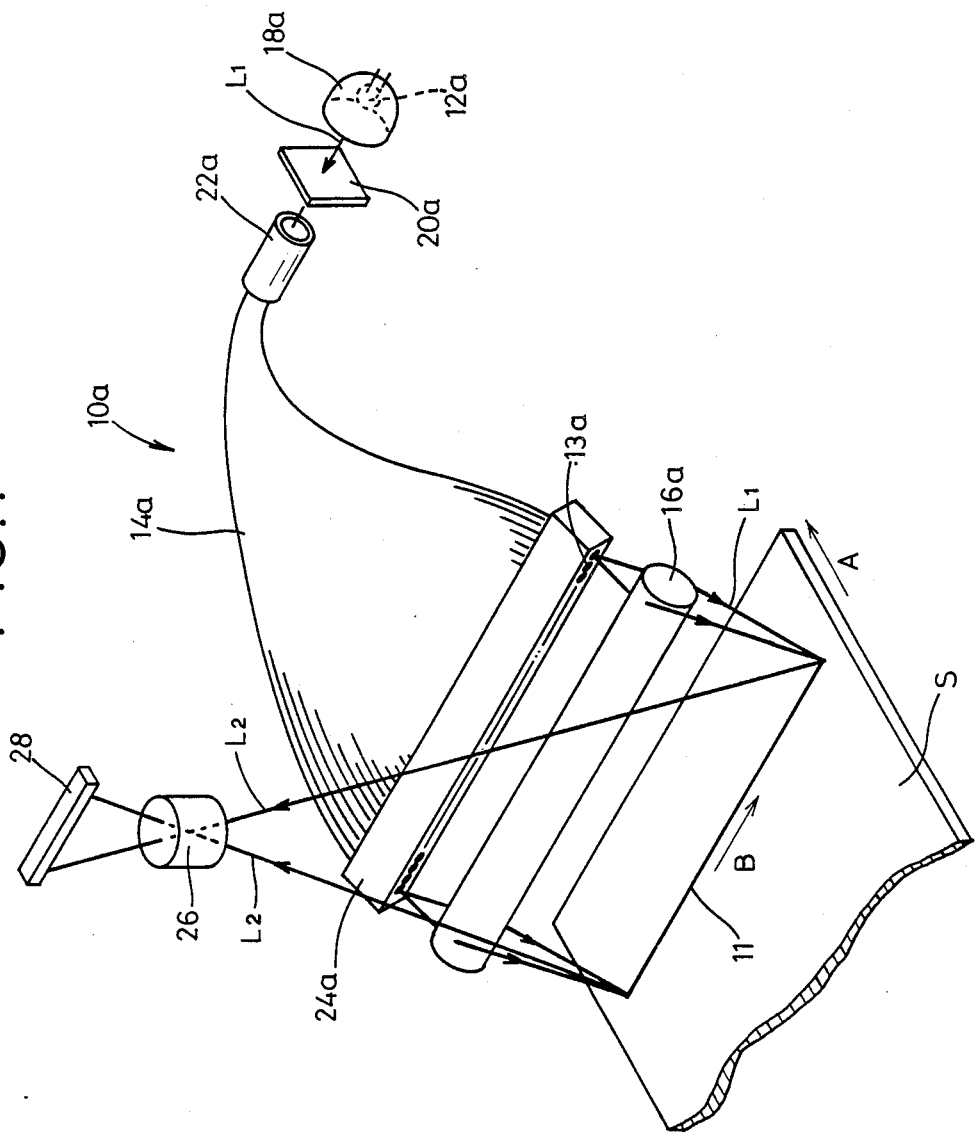
FIG. 1 is a schematic perspective view of a subject illuminating device, partly omitted from illustration, according to the present invention.
Figure 2:
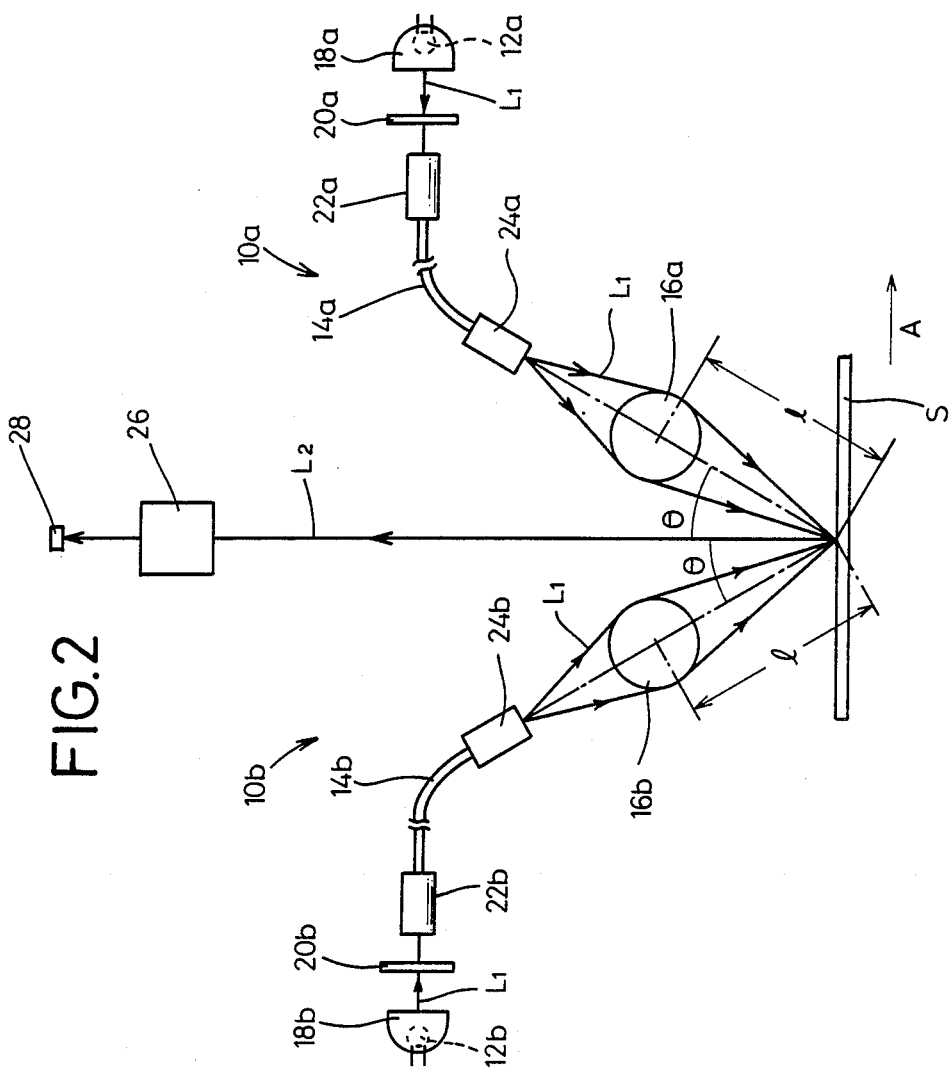
FIG. 2 is a side elevational view of the subject illuminating device.

FIGS. 1 and 2 shows subject (original) illuminating devices 10a, 10b according to the present invention. The subject illuminating devices 10a, 10b illuminate a subject or original S carrying image information continuously along a main scanning line 11 while the subject S is being fed in an auxiliary scanning direction indicated by the arrow A. Since the subject illuminating devices 10a, 10b are of identical structure, only the subject illuminating device 10a will be described below with corresponding parts of the subject illuminating device 10b being denoted by corresponding reference numerals with a suffix b.

The subject illuminating device 10a includes a spot-like light source 12a comprising a halogen lamp, a xenon lamp, or the like, an optical fiber bundle 14a of a multiplicity of bundled optical fibers 13a for guiding illuminating light $L_1$ emitted from the light source 12a toward a subject or original S, and a cylindrical lens 16a for collecting the illuminating light $L_1$ into a linear beam along a main scanning line 11 on the subject S.

The light source 12a is surrounded by a reflecting mirror 18a of a spheroidal shape which has an opening confronting one surface of an infrared absorbing filter 20a with an antireflection coating. A cylindrical light guide 22a of acrylic resin is disposed near the other surface of the infrared absorbing filter 20a. The optical fibers 13a have ends mounted on one end of the light guide 22a remotely from the infrared absorbing filter 20a. The optical fibers 13a should preferably comprise plastic optical fibers capable of easily guiding the illuminating light $L_1$ to a desired location on the subject S.

Figure 3:
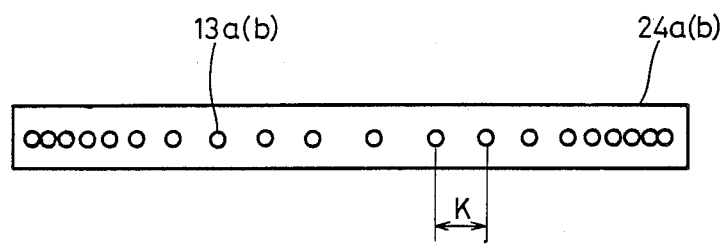
FIG. 3 is a view of light emitting ends of optical fibers of the subject illuminating device.

The other ends of the optical fibers 13a are positioned in spaced relation to the subject S with the optical fibers 13a being curved as shown, and are housed in an elongate housing 24a as a linear array along the main scanning line 11 on the subject S. As shown in FIG. 3, the ends, or light emitting ends, of the optical fibers 13a retained in the housing 24a are spaced at intervals k which are progressively smaller from the center toward the opposite ends of the housing 24a. These light emitting ends may be spaced at intervals which are spaced in a step-like manner from the center toward the opposite ends of the housing 24a. As illustrated in FIG. 2, the housing 24a is oriented toward the subject S such that the optical axis of the illuminating light $L_1$ emitted from the ends of the optical fibers 13a and a vertical line normal to the subject S form an angle $\theta$ ranging from 20° to 40° therebetween for permitting a readou optical system to collect light efficiently from the subject S.

The cylindrical lens 16a is disposed between the ends of the optical fibers 13a and the subject S and extends parallel to the main scanning line 11. The distance l between the center of the cylindrical lens 16a and the main scanning line 11 on the subject S should preferably be slightly smaller than the focal length of the cylindrical lens 16a with respect to paraxial rays thereof.

A CCD 28 is disposed upwardly of the main scanning line 11 on the subject S with a focusing lens 26 therebetween, for focusing light $L_2$ reflected by image information carried on the subject S onto the CCD 28, which photoelectrically converts the reflected light $L_2$ into an electric image signal.

The subject illuminating device which is basically constructed above operates as follows:

The illuminating light $L_1$ emitted from the light source 12a is collected by the spheroidal reflecting mirror 18a and applied through the infrared absorbing filter 20a to the cylindrical light guide 22a on the ends of the optical fibers 13a. The illuminating light $L_1$ which has entered the light guide 22a is reflected by the inner wall surface of the light guide 22a so as to be highly efficiently applied to the ends of the optical fibers 13a. Since the illuminating light $L_1$ is reflected randomly in the light guide 22a, a uniform quantity of illuminating light $L_1$ falls on the ends of the optical fibers 13a.

The illuminating light $L_1$ is then guided through the optical fiber bundle 14a which is curved to desired shape, and is emitted from the other ends of the optical fibers 13a toward the main scanning line 11 on the subject S. The illuminating light $L_1$ thus emitted from the ends of the optical fibers 13a is converged by the cylindrical lens 16a only in an auxiliary scanning direction indicated by the arrow A along which the subject S is fed, onto the main scanning line 11 on the subject S. As a result, the subject S is illuminated by the illuminating light $L_1$ along the main scanning line 11.

Figure 4:
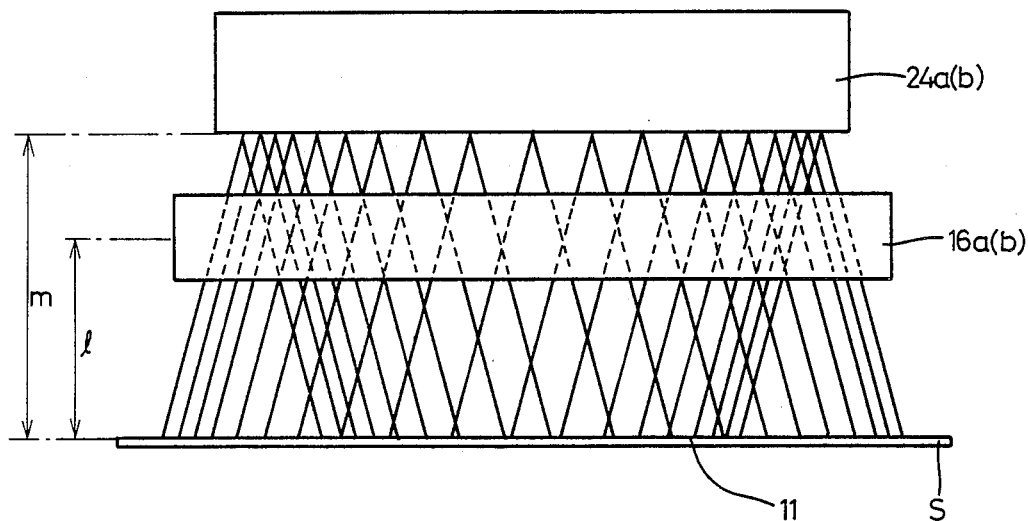
FIG. 4 is a front elevational view of the subject illuminating device.
Figure 5A:
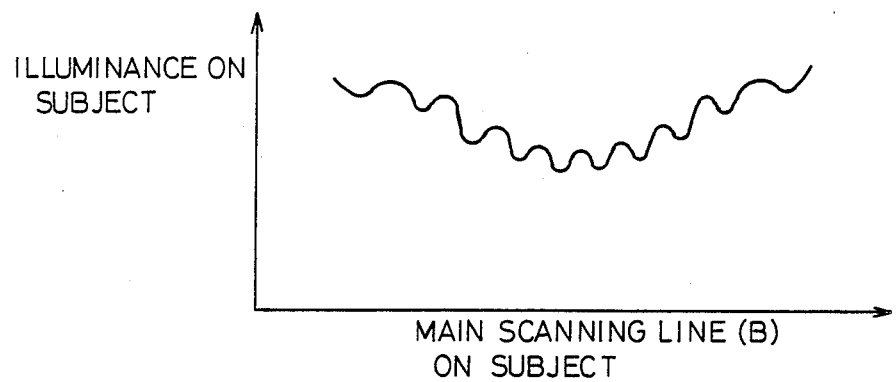
FIG. 5a is a graph showing a characteristic curve of illuminating light emitted from a conventional subject illuminating device.

As illustrated in FIG. 3, the intervals k between the ends of the optical fibers 13a retained in the housing 24a are progressively smaller from the center toward the opposite ends of the housing 24a. Therefore, the illuminating light $L_1$ emitted from the ends of the optical fibers 13a is scattered as shown in FIG. 4 while being applied to the subject S along the main scanning line 11 through the cylindrical lens 16a. If the optical fibers 13a were located closely to the subject S just like the LEDs disclosed in Japanese Laid-Open Patent Publication No. 56-161773, the illuminance of the subject surface illuminated by the illuminating light $L_1$ along the main scanning line 11 would have significant irregularities or fluctuation as shown in FIG. 5a. According to the illustrated embodiment, however, since the distance m (FIG. 4) between the subject S and the light emitting ends of the optical fibers 13a is large with the cylindrical lens 16a disposed therebetween, the beams of the illuminating light $L_1$ emitted and scattered from the light emitting ends of the optical fibers 13a are effectively overlapped on the main scanning line 11 on the subject S, and focused onto the main scanning line 11 by the cylindrical lens 16a. As a result, the main scanning line 11 on the subject S is illuminated with high illuminance by the illuminating light $L_1$ which has a higher degree of intensity or brightness at the ends of the optical fiber array and which is free of intensity fluctuation or irregularities, as shown in FIG. 5b.

The subject S illuminated by the illuminating light $L_1$ from the subject illuminating devices 10a, 10b then reflects image information as reflected light $L_2$ from the main scanning line 11. The reflected light $L_2$ is focused by the focusing lens 26 onto the CCD 28 which photoelectrically converts the light into an electric image signal. Since the subject S is fed in the auxiliary scanning direction of the arrow A by a feed mechanism (not shown), the image information carried on the entire surface of the subject S is converted to an image signal.

Figure 5B:
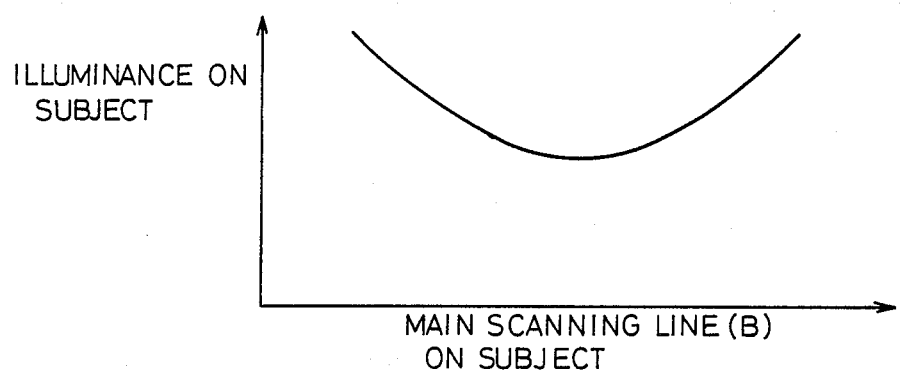
FIGS. 5b and 5c are graphs showing a characteristic curve of illuminating light emitted from the subject illuminating device of the present invention and a characteristic curve of light reflected from a subject which is illuminated by light emitted from the subject illuminating device of the invention.
Figure 5C:
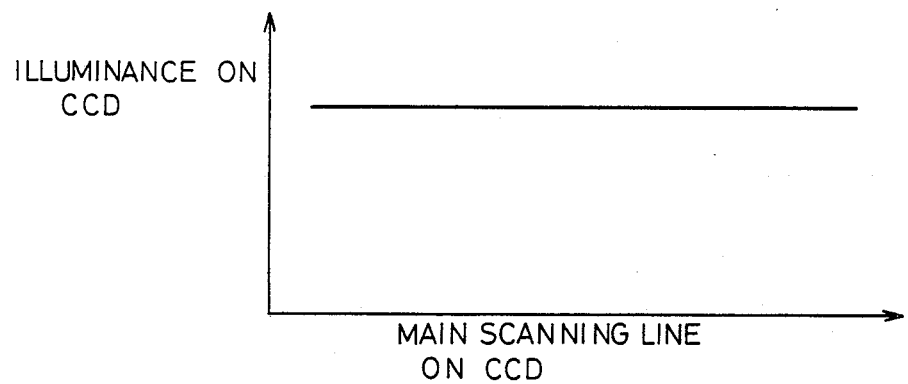

If the subject S is a uniformly white sheet, then the reflected light $L_2$ as it leaves the subject S has the same characteristic curve as that shown in FIG. 5b. Therefore, the reflected light $L_2$ as it reaches the CCD 28 through the focusing lens 26 has a characteristic curve as shown in FIG. 5c which is corrected by the shading caused by the focusing lens 26. Consequently, the image information of the subject S illuminated by the illuminating light $L_1$ is focused on the CCD 28 with the image shading being completely corrected, and hence a highly accurate image signal is generated.

Figure 6:
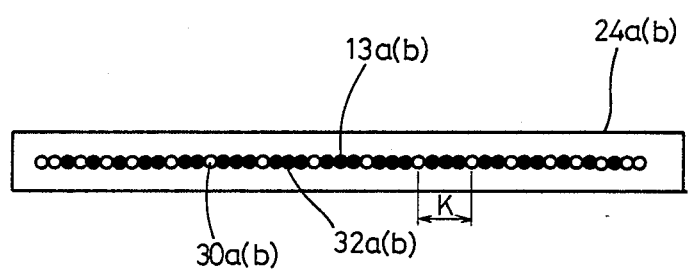
FIG. 6 is a view of light emitting ends of optical fibers of a subject illuminating device according to another embodiment of the present invention.

In the above embodiment, as shown in FIG. 3, the intervals k between the light emitting ends of the optical fibers 13a, 13b are varied to correct the shading of image information represented by the illuminating light $L_1$. Such shading correction may however be effected more easily by arranging the light emitting ends of the optical fibers as shown in FIG. 6. In FIG. 6, the light emitting ends of the optical fibers 13a, 13b housed in the housings 24a, 24b are spaced at equal intervals, or more specifically, held closely against adjacent ones, along the main scanning line 11. Some of the ends of the optical fibers 13a, 13b are used as light emitting ends 30a, 30b for emitting the illuminating light $L_1$, whereas the other ends are coated or otherwise treated with a light-shielding means, such as a light-shielding coating, so as to serve as light blocking ends 32a, 32b for preventing the illuminating light $L_1$ from being emitted therefrom. The intervals k between the light emitting ends 30a, 30b are selected to be progressively smaller from the center toward the opposite ends of the housings 24a, 24b. The embodiment of FIG. 6 is as effective in correcting the shading of images as the embodiment shown in FIG. 3, and is more advantageous in that the intervals k between the light emitting ends 30a, 30b can be selected very easily. Instead of coating selected ones of the optical fiber ends near the subject, the ends of the optical fibers near the light source may selectively be associated with a light-shielding means.

With the present invention, as described above, the illuminating light is applied to the cylindrical lens from the optical fibers which are spaced progressively more closely from the center to the opposite ends of the optical fiber array along the main scanning line on the subject, and then is converged through the cylindrical lens as a linear beam onto the subject. Therefore, the illuminating light illuminates the main scanning line with greater illuminance at the opposite ends than at the center thereof, and also without small illuminance irregularities, so that the shading of a reproduced image which would otherwise be caused by the read-out optical system can be eliminated thereby to obtain accurate image information. Since the illuminating light from the spot-like light source is highly effectively guided toward the subject, reproduced image information is of lower noise and higher contrast.

Although certain preferred embodiments have been shown and described, it should be understood that many changes and modifications may be made therein without departing from the scope of the appended claims.

What is claimed is:

1. A subject illuminating device comprising:
   a spot-like light source for emitting illuminating light;
   a plurality of optical fibers having first ends bundled together near said light source and opposite ends arranged in an array along a main scanning line on a subject to be illuminated, said opposite ends in the array being spaced at intervals which are progressively smaller from a center toward opposite ends of said array; and
   a cylindrical lens disposed between said opposite ends of the optical fibers and said subject for converging, without focusing, the illuminating light from said opposite ends of the optical fibers into a linear beam along the main scanning line on the subject, the distance between the main scanning line and the longitudinal axis of said cylindrical lens being slightly smaller than the focal length of said cylindrical lens with respect to paraxial rays thereof, so that the illuminating light illuminates the main scanning line with greater illuminance at the opposite ends than at the center thereof, and also without small illuminance irregularities.

2. A subject illuminating device according to claim 1, further comprising a cylindrical light guide disposed between said light source and said first ends of the optical fibers and having an inner reflecting wall surface.

3. A subject illuminating device according to claim 1, further comprising a housing which accommodates therein said opposite ends of the optical fibers.

4. A subject illuminating device according to claim 1, wherein some of said intervals are equal to each other.

5. Subject illuminating device according to claim 1, wherein said array is a linear array of only a single row of said opposite ends.

6. A subject illuminating device comprising:
   a spot-like light source for emitting illuminating light;
   a plurality of optical fibers having first ends bundled together near said light source and equally spaced opposite ends arranged in an array along a main scanning line on a subject to be illuminated, said opposite ends including selected light emitting ends spaced at intervals which are progressively smaller from a center toward opposite ends of said array; and
   a cylindrical lens disposed between said opposite ends of the optical fibers and said subject for converging, without focusing, the illuminating light from said selected light emitting ends of the optical fibers into a linear beam along the main scanning line on the subject, the distance between the main scanning line and the longitudinal axis of said cylindrical lens being slightly smaller than the focal length of said cylindrical lens with respect to paraxial rays thereof, so that the illuminating light illuminates the main scanning line with greater illuminance at the opposite ends than at the center thereof, and also without small illuminance irregularities.

7. A subject illuminating device according to claim 6, further comprising a cylindrical light guide disposed between said light source and said first ends of the optical fibers and having an inner reflecting wall surface.

8. A subject illuminating device according to claim 6, further comprising a housing which accommodates therein said opposite ends of the optical fibers.

9. Subject illuminating device according to claim 6, wherein said array is a linear array of only a single row of said opposite ends.

10. A subject illuminating device comprising:
    a spot-like light source for emitting illuminating light;
    a plurality of optical fibers having first ends bundled together near sid light source and equally spaced opposite ends arranged in an array along a main scanning line on a subject to be illuminated, said opposite ends including selected light emitting ends spaced at intervals which are progressively smaller from a center toward opposite ends of said array;
    a cylindrical lens disposed between said opposite ends of the optical fibers and said subject for converging the illuminating light from said selected light emitting ends of the optical fibers onto the main scanning line on the subject; and
    wherein one of said equally spaced opposite ends in the array and said first ends of the optical fibers near said light sources is selectively associated with light-shielding means for making the intervals of said selected light emitting ends progressively smaller from the center toward the opposite ends of said array.

11. A subject illuminating device according to claim 10, wherein said light-shielding means comprises a light-shielding coating on each of selected opposite ends of said optical fibers.

12. A subject illuminating device according to claim 10, wherein some of said intervals are equal to each other.

13. A subject illuminating device comprising:
    a spot-like light source for emitting illuminating light;
    a plurality of optical fibers having first ends bundled together near sid light source and opposite ends arranged in an array along a main scanning line on a subject to be illuminated, said opposite ends in the array being spaced at intervals which are progressively smaller from a center toward opposite ends of said array;
    a cylindrical lens disposed between said opposite ends of the optical fibers and said subject for converging the illuminating light from said opposite ends of the optical fibers onto the main scanning line on the subject; and
    an image reading device comprising: a charge-coupled device means for photoelectrically converting into an electric image signal the reflected light from said main scanning line; and focusing lens means, disposed between said charge-coupled device and said main scanning line, for focusing said reflected light onto said charge-coupled device means.

* * * * *